May 28, 1963

B. R. HALL 3,091,670

PHONE HOLDER

Filed Nov. 2, 1959

INVENTOR.
BERTIE R. HALL

BY Bruce & Brosler

HIS ATTORNEYS

United States Patent Office 3,091,670
Patented May 28, 1963

3,091,670
PHONE HOLDER
Bertie R. Hall, 6323 Knott Blvd., El Cerrito, Calif.
Filed Nov. 2, 1959, Ser. No. 850,175
8 Claims. (Cl. 179—156)

My invention relates to phone holders and more particularly to a holder for phones of the handset type. The present invention is an improvement upon that of my Patent No. 2,761,914 for Telephone Handset Holder.

Among the objects of my invention are:

(1) To provide a novel and improved holder for phones of the handset type;

(2) To provide a novel and improved holder for phones of the handset type, which offers positive support for the phone while in use;

(3) To provide a novel and improved holder for phones of the handset type, which will permit unrestricted movements of the wearer with a feeling of assurance that the phone will remain stable;

(4) To provide a novel and improved holder for phones of the handset type, which will offer the user full freedom of his hands and arms to carry on other duties; and (5) To provide a novel and improved holder for phones of the handset type, which holder is permanently securable to the phone without interfering with the conventional phone cradle in which the phone is normally placed when not in use.

Additional objects of my invention will be brought out in the following description of a preferred embodiment of the same, taken in conjunction with the accompanying drawings wherein.

Figures 1, 2:
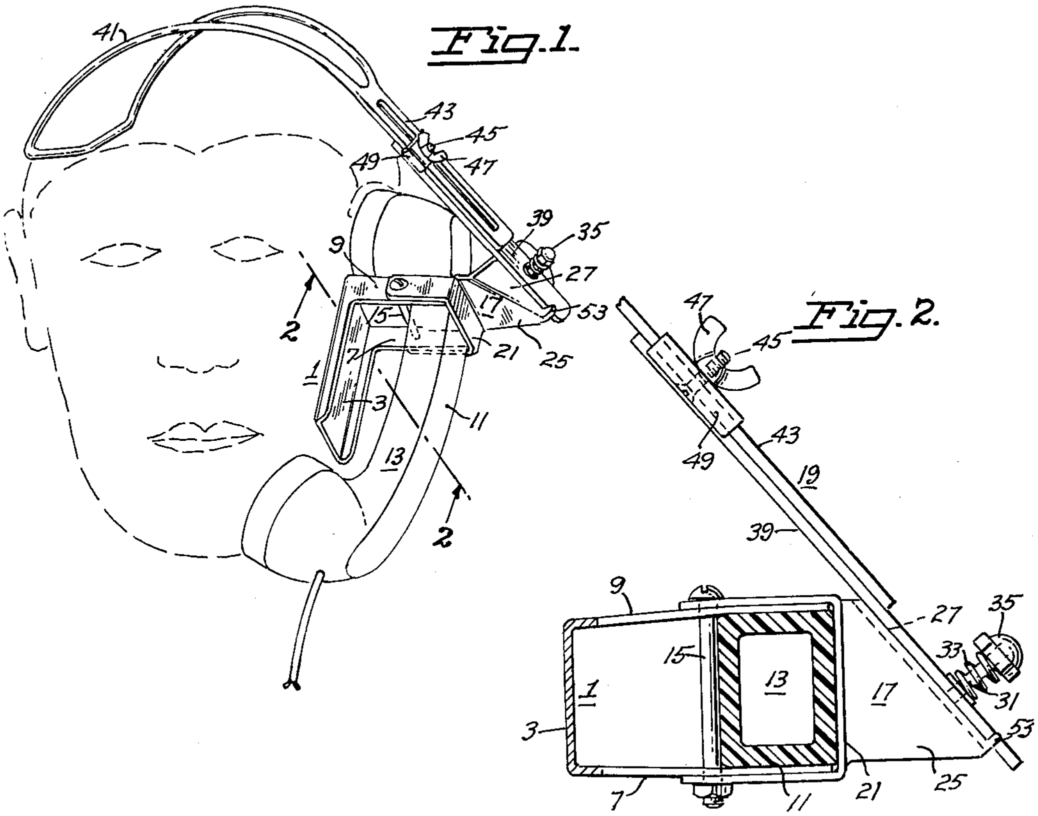
FIG. 1 is a three dimensional view of the phone holder of the present invention, depicting the same in use.
FIG. 2 is a view in section, taken in the plane 2—2 of FIG. 1.
Figure 3:
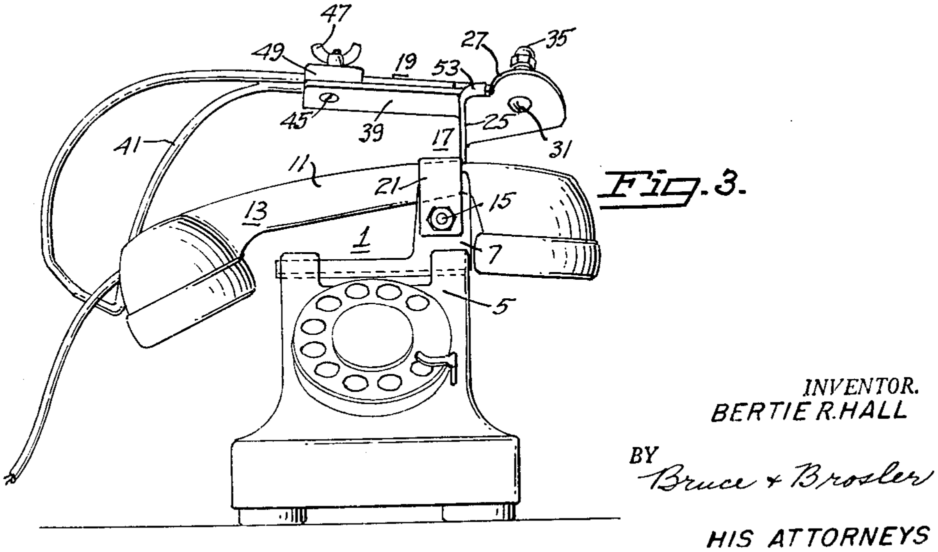
FIG. 3 is a view depicting the phone and holder in its relationship to the cradle in which the phone is normally placed when not in use.

Referring to the drawings for details of my invention in its preferred form, the same comprises a cheek rest 1 including a plate 3 of a length and width adapting it to fit a conventional cradle 5 of a phone support in which the phone is normally placed when not in use, such plate having ears 7, 9 adapting it to straddle the hand grip 11 of a phone 13 of the handset type, the ears having bolt holes in alignment to receive a clamping bolt 15.

Associated with the cheek rest is a bracket 17 for mounting a head band assembly 19, such bracket including a U-shape clamping portion 21 adapted to straddle the aforementioned hand grip of a phone, said U-shaped clamping portion having bolt holes matching those in the cheek rest, through which the clamping bolt 15 also is adapted to pass.

Extending from the clamping portion in substantially a plane paralleling the plane of the clamping portion, is a bracket arm 25, at the terminal end of which is a mounting platform 27 for the head band assembly, such platform lying substantially in a diagonal plane, substantially normal to the plane of the bracket arm 25.

The head band assembly 19 is pivotally secured to the mounting platform for swinging movement in substantially the plane of the platform, and this is accomplished by a machine screw or stove bolt 31 passing through the mounting platform and the proximate end of the head band assembly, the exposed portion of the screw or bolt passing through a compression spring 33 and having a cap nut 35 threaded thereon in pressure engagement with the spring, whereby to permit adjustment of the friction between the head band assembly and its mounting platform.

The head band assembly includes a shank 39, one end of which constitutes the mounting end for the head band assembly, a head band in the form, preferably of an arced wire frame 41 of generally triangular form, and means for adjustably securing this frame at its narrow end to the shank. Such means of adjustably securing the head band to the shank may take the form of a slotted extension 43 from the narrow end of the wire frame, overlying the shank and adapted to be clamped in any adjusted position by a screw 45 mounted in the shank and passing through the slotted extension to take a wing nut 47. A slider 49 disposed between the extension 43 and the wing nut 47 and having depending sides straddling the shank 39, will maintain the head frame extension and shank in alignment at all times.

In assembling the phone holder to a handset type phone, the cheek plate 3 is disposed so as to engage the cheek of the user, while the bracket 17 extends outwardly in the opposite direction, the clamping bolt 15 serving to clamp both these components in their proper relationships to the handset.

When so installed and with the head band adjusted to the head of the user, the cheek plate will rest against the cheek of the user, thus lending firm support to the phone with the ear piece against the ear of the user and the mouth end of the phone in close proximity to the mouth. When thus worn, the user has a feeling of assurance that the phone will remain in such position despite normal movements of the individual wearing the same, and it will be appreciated that under these conditions, the user has both hands and arms free for performing other duties, such as taking notes or operating a typewriter.

When the phone is no longer required, the entire assembly is removed from the head and the head band rotated to a position of substantial alignment with the handset, and the phone then replaced in its cradle, it being noted that the cheek plate enters the cradle and engages and depresses the two spaced switch buttons which would normally be engaged by the handset when no holder is involved.

It is further to be noted, that the bracket arm 25 is of sufficient length to provide space between the handset and the head band for one to readily grasp the handset in the normal manner when answering the phone. If the nature of the conversation requires free use of both hands, and if the phone is grasped with the left hand, the individual, then with his right hand, may swing the head band for positioning the same over his head, whereupon the weight of the phone will carry the cheek plate into engagement with his cheek and thus support the phone in proper position for carrying on the conversation, while permitting both hands and arms to be free.

The angle of swing of the head band from its position of rest in substantial alignment with the handset to its position of use, is not critical but may be somewhat in excess of 90 degrees. To facilitate locating the head band in either of these two limiting positions, I have found that this can be readily accomplished by a single stop 53 on the bracket platform, against which the shank of the head band assembly may abut when it reaches either of these two positions.

From the foregoing description of my invention in its preferred form, it will be apparent that it fulfills all the objects attributable thereto, and while I have illustrated and described my preferred embodiment in considerable detail, I do not desire to be limited in my protection to such details except as may be necessitated by the appended claims.

I claim:

1. A holder for a telephone of the handset type comprising a cheek rest including a cheek plate adapted to fit the cradle of a handset type telephone support when not in use; a head band assembly bracket including a mounting platform for a head band assembly; means for affixing said cheek rest and said bracket to the handgrip portion of a handset type telephone; and a head band assembly secured to said mounting platform.

2. A holder for a telephone of the handset type comprising a cheek rest including a cheek plate adapted to fit the cradle of a handset type telephone support when not in use; a head band assembly bracket including a mounting platform for a head band assembly; means for affixing said cheek rest and said bracket to the handgrip portion of a handset type telephone; and a head band assembly pivotally secured to said mounting platform for swinging movement in substantially the plane of said platform.

3. A holder for a telephone of the handset type comprising a cheek rest including a cheek plate adapted to fit the cradle of a handset type telephone support when not in use; a head band assembly bracket including a mounting platform for a head band assembly; means for affixing said cheek rest and said bracket to the handgrip portion of a handset type telephone; a head band assembly pivotally secured to said mounting platform for swinging movement in substantially the plane of said platform; and means for limiting permissible swing of said head band assembly from a position of rest substantially in line with said cheek rest through an angle to a position of use.

4. A holder for a telephone of the handset type comprising a cheek rest including a cheek plate of a length and width adapting it to fit the cradle of a handset type telephone support when not in use; a head band assembly bracket including a U-shape clamping portion adapted to straddle the aforementioned handgrip of a telephone, a bracket arm extending from said clamping portion in substantially a plane paralleling the median plane of said U-shaped clamping portion, and a mounting platform for a head band assembly in a plane substantially normal to the plane of said bracket arm and at an angle to an edge of said bracket arm; means for affixing said cheek rest and said bracket to the handgrip portion of a handset phone; a head band assembly pivotally secured to said mounting platform for swinging movement in substantially the plane of said platform, said head band assembly including a shank, a head band, and means adjustably securing said head band at one end to said shank; and means for limiting permissible swing of said head band assembly from a position of rest substantially in line with said cheek rest through an angle to a position of use.

5. A holder for a telephone of the handset type comprising a cheek rest including a cheek plate of a length and width adapting it to fit the cradle of a handset type telephone support when not in use and having ears adapted to straddle the handgrip of a telephone of the handset type, said ears having bolt holes in alignment to receive a clamping bolt; a head band assembly bracket including a U-shape clamping portion adapted to straddle the aforementioned hand grip of a telephone, said U-shape clamping portion having bolt holes matching those in said cheek rest, a bracket arm extending from said clamping portion, and a mounting platform for a head band assembly in a plane substantially normal to the plane of said bracket arm and at an angle to an edge of said bracket arm, a head band assembly pivotally secured to said mounting platform for swinging movement in substantially the plane of said platform, said head band assembly including a shank, a head band comprising an arcuate frame of generally triangular form, and means adjustably securing said frame at its small end to said shank, and means for limiting permissible swing of said head band assembly from a position of rest substantially in line with said cheek rest through an angle to a position of use.

6. A holder for a telephone of the handset type comprising a cheek rest including a cheek plate of a length and width adapting it to fit the cradle of a handset type telephone support when not in use and having ears adapted to straddle the hand grip of a telephone of the handset type, said ears having bolt holes in alignment to receive a clamping bolt; a head band assembly bracket including a U-shape clamping portion adapted to straddle the aforementioned hand grip of a phone, said U-shape clamping portion having bolt holes matching those in said cheek rest, a bracket arm extending from said clamping portion in substantially a plane parelleling the median plane of said U-shape clamping portion, and a mounting platform for a head band assembly in a plane substantially normal to the plane of said bracket arm and at an angle to an edge of said bracket arm; a head band assembly pivotally secured to said mounting platform for swinging movement in substantially the plane of said platform, said head band assembly including a shank, a head band comprising a substantially arcuate frame of generally triangular form, and means adjustably securing said frame at its small end to said shank; and means for limiting permissible swing of said head band assembly from a position of rest substantially in line with said cheek rest through an angle of substantially one hundred thirty five degrees to a position of use.

7. Means for stably supporting a handset type telephone with the earpiece adjacent the ear of a user and the mouthpiece in the vicinity of but in stable spaced relationship to the mouth of said user, said means comprising a head band assembly connectable to said telephone and adapted to straddle the head of said user and support said telephone with its earpiece adjacent the ear of said user, and a cheek rest affixed to said telephone for engagement with the cheek of said user to support said telephone away from the user's cheek and with said mouthpiece in the vicinity of but in stable spaced relationship to the user's mouth.

8. In combination, a telephone of the handset type including a handgrip with a mouthpiece at one end and an earpiece at the other end, and a plate supported between said mouth piece and said earpiece and spaced from said handgrip sufficiently to provide a cheek rest for stabilizing said handset with said mouthpiece in the vicinity of and in stable spaced relationship to the mouth of a user when said earpiece is in engagement with the ear of said user.

References Cited in the file of this patent

UNITED STATES PATENTS

| | | |
|---|---|---|
| 2,538,458 | Hutchinson | Jan. 16, 1951 |
| 2,721,234 | Gillie | Oct. 18, 1955 |
| 2,722,571 | Patrie | Nov. 1, 1955 |